(12) United States Patent
Hamby

(10) Patent No.: US 10,946,809 B1
(45) Date of Patent: Mar. 16, 2021

(54) SUPPORT FOR ELECTRONIC DEVICES WITH AN ATTACHMENT TO CHILD SEATS

(71) Applicant: Charles Hamby, Fairbanks, AK (US)

(72) Inventor: Charles Hamby, Fairbanks, AK (US)

(*) Notice: Subject to any disclaimer, the term of this patent is extended or adjusted under 35 U.S.C. 154(b) by 36 days.

(21) Appl. No.: 16/519,371

(22) Filed: Jul. 23, 2019

(51) Int. Cl.
*B60R 11/00* (2006.01)
*B60R 11/02* (2006.01)

(52) U.S. Cl.
CPC ...... *B60R 11/0235* (2013.01); *B60R 11/0241* (2013.01); *B60R 11/0252* (2013.01); *B60R 2011/0014* (2013.01); *B60R 2011/0059* (2013.01); *B60R 2011/0091* (2013.01)

(58) Field of Classification Search
USPC ...................................... 248/309.1, 102–107
See application file for complete search history.

(56) References Cited

U.S. PATENT DOCUMENTS

| | | | | |
|---|---|---|---|---|
| 3,289,986 A * | 12/1966 | Martin | ............ | A61J 9/0623 248/103 |
| 5,464,183 A * | 11/1995 | McConnell | ............ | B62B 9/26 248/311.2 |
| D597,788 S * | 8/2009 | Ellis | ............ | D7/387 |
| 8,020,829 B1 * | 9/2011 | Tamayori | ............ | B62B 9/26 248/447.2 |
| 8,267,294 B2 * | 9/2012 | Yu | ............ | F16M 11/24 224/623 |
| 9,125,475 B2 * | 9/2015 | Garza, Jr. | ............ | F16M 11/14 |
| 9,249,927 B2 * | 2/2016 | Graham | ............ | F16M 13/04 |
| 9,695,849 B2 * | 7/2017 | Zhou | ............ | F16B 2/12 |
| 10,081,382 B1 * | 9/2018 | Alton | ............ | B62B 3/1424 |
| 10,512,322 B2 * | 12/2019 | Washington | ............ | F16M 11/14 |
| 2006/0163301 A1 * | 7/2006 | Rhodes | ............ | B60R 11/00 224/409 |
| 2010/0078536 A1 * | 4/2010 | Galvin | ............ | F16M 11/041 248/231.51 |
| 2012/0118929 A1 * | 5/2012 | Chuah | ............ | B62B 9/005 224/409 |
| 2012/0175394 A1 * | 7/2012 | Keune | ............ | F16M 13/04 224/483 |
| 2015/0358044 A1 * | 12/2015 | Barstead | ............ | H04B 1/3888 455/575.1 |
| 2016/0183393 A1 * | 6/2016 | Groom | ............ | B62B 9/26 280/33.992 |
| 2020/0015577 A1 * | 1/2020 | Biddings, Jr. | ............ | F16M 11/14 |

FOREIGN PATENT DOCUMENTS

GB    2561071 A  * 10/2018 ............. F16M 11/40

* cited by examiner

*Primary Examiner* — Monica E Millner
(74) *Attorney, Agent, or Firm* — Michael J. Tavella

(57) ABSTRACT

An electronic device support for attachment to child seats that has a bracket that sits atop one of the arms of the child seat. The bracket has an adjustable strap attached to one side. The strap is wrapped around the arm of the child seat and secured. It can be pulled tight to secure the bracket. The bracket has a center bridge, which spans the top of the child seat arm. A goose-neck pole, approximately 24-36 inches long is attached to the center of the bridge and extends upwards therefrom. The goose-neck pole can be positioned at a comfortable angle and height for use of the device by the child. At the top of the goose-neck is a device holder designed to hold a smartphone or tablet. In this way, a child can watch videos, play learning games or do other activities all while staying safe in the child seat.

9 Claims, 10 Drawing Sheets

US 10,946,809 B1

SUPPORT FOR ELECTRONIC DEVICES WITH AN ATTACHMENT TO CHILD SEATS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to electronic device supports and particularly to electronic device supports with an attachment to child seats.

2. Description of the Prior Art

For several years, children have been required to ride in child seats. In 2019, 48 states, Puerto Rico, and the District of Columbia require the use of booster seats or harnesses if your child has outgrown a baby seat but is still too small to safely ride in a car using an adult seat belt.

Another trend is the increased use of tablets and smartphones to entertain children while driving. Normally, these devices are placed in holders that are suspended from the front seat back. While suitable for use with young children, older children who are still required to use booster seats, have the ability to better operate these devices if they are placed closer to the child. Presently, there is no simply way to achieve this.

BRIEF DESCRIPTION OF THE INVENTION

The instant invention overcomes the difficulty described above. It is a holder for devices such as tablets and smartphones, that is attached to a goose-neck rod, which in turn is attached to a mounting harness that is removably attached to the arm of a child seat. The invention consists of a bracket that sits over one of the arms of the child seat. The bracket has an adjustable strap attached to one side. The strap is wrapped around the arm of the child seat and secured. It can be pulled tight to secure the bracket. The bracket has a center bridge, which spans the top of the child seat arm. A goose-neck pole, approximately 24-36 inches long is attached to the center of the bridge and extends upwards therefrom. The goose-neck pole, being flexible can be positioned at a comfortable angle and height for use of the device by the child. At the top of the goose-neck is a device holder designed to hold a smar tphone or tablet. In this way, a child can watch videos, play learning games or do other activities all while staying safe in the child seat.

BRIEF DESCRIPTION OF THE DRAWINGS

FIG. 7a is a detail view of the auxiliary clip and strap showing the

DETAILED DESCRIPTION OF THE INVENTION

Figure 1:
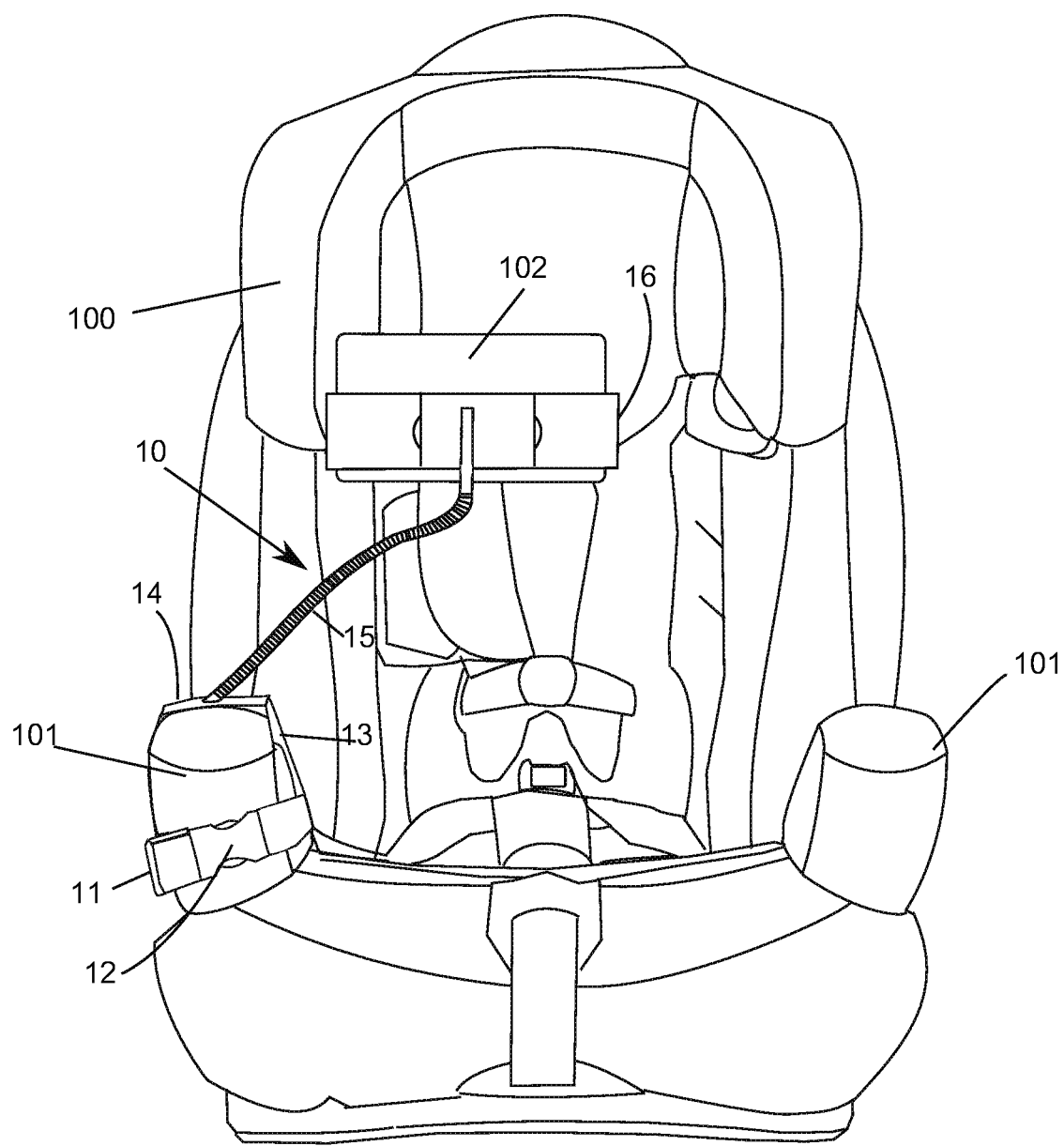
FIG. 1 is a front view of the invention installed on the arm of a child seat.
Figure 2:
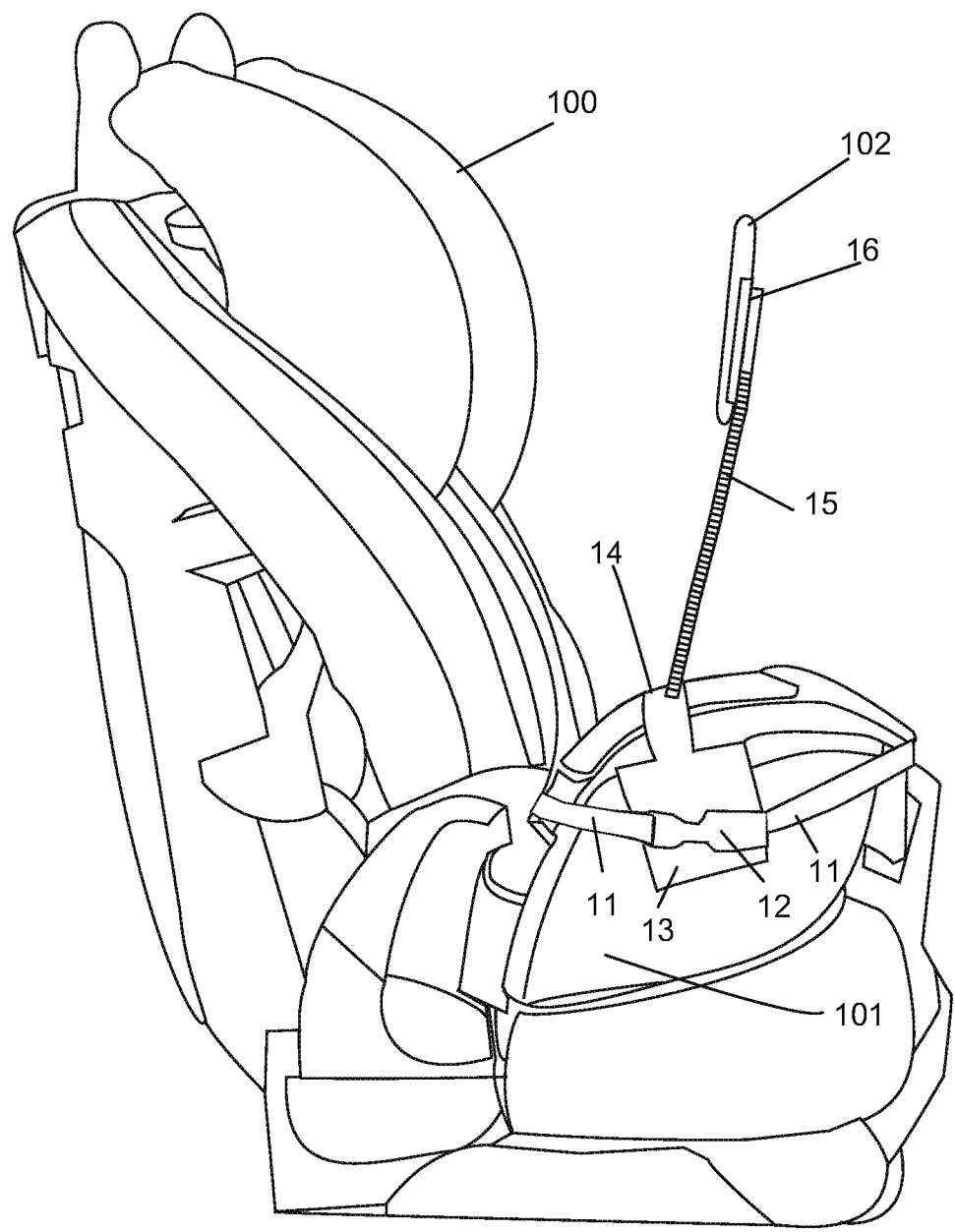
FIG. 2 is an side view of the invention installed on the arm of a child seat.
Figure 3:
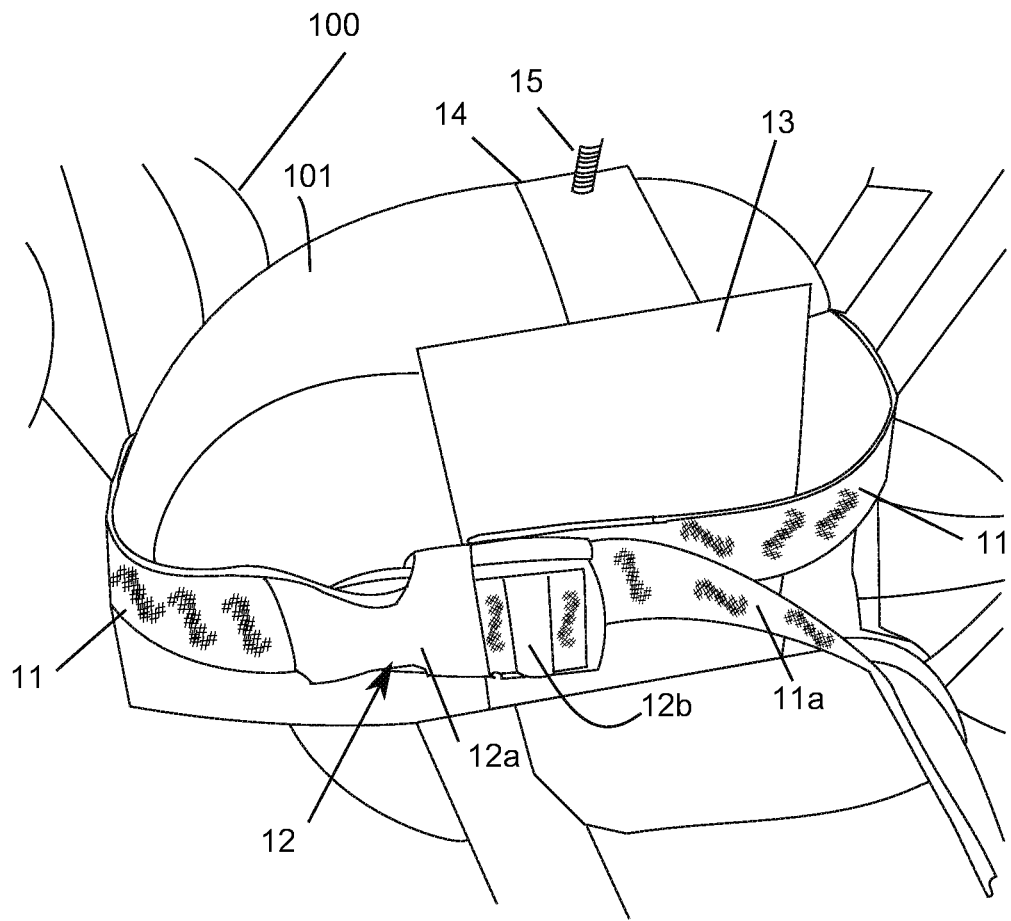
FIG. 3 is a side detail view of the invention installed on the arm of a child seat.

Referring now to the drawings and especially to FIGS. 1, 2, and 3, the invention 10 is shown attached to the arm 101 of child seat 100. FIG. 1 is a front view of the invention 10 installed on the arm 101 of a child seat 100. FIG. 1 shows a specific type of child seat. However, any type of child seat or booster seat can be used as long as the seat has arms. The invention 10 has a strap 11 has a snap clip type connector 12 that is used to secure the bracket 13 (see also FIGS. 2, 3, and 5) to the seat. The bracket 13 has a bridge 14 that fits atop the armrest 101 as shown. A goose-neck pole 15 is attached to the bridge as discussed below. The goose-neck pole 15 is flexible and can be adjusted as desired. At the distal end of the goose-neck pole 15 is a device holder 16, which holds a tablet or smartphone 102.

FIG. 2 is an side view of the invention installed on the arm of a child seat. Here, the seat 100, and arm rest 101 are shown. The bracket 13 is shown secured to the arm rest 101 with the strap 11 and the snap clip 12. The bridge 14 is shown with the goose-neck pole 15 attached. Note the device holder 16 has a user device 102 in it, such as a tablet or smart phone.

FIG. 3 is a enlarged side detail view of the invention installed on the arm of a child seat. In this view, more details of the device 10 are shown. The seat 100 and arm rest 101 are shown with the bracket 13 placed on the arm rest. As noted above, the bracket 13 is secured with an adjustable strap 11 that has a snap type connector 12, which has two pieces. First is the female receiver 12a, with is attached to one end of the strap 11, and a male clip 12b, which engages the female portion and clips the strap together. The clip portion 12b also has an adjustable portion through which the strap is laced. This allows a user to loosen the strap within the clip to pull it through to shorten the overall length of the strap. Note the excess strap 11a, which hangs from the clip portion 12b after tightening the strap. Also shown are the bridge 14 and the bottom of the goose-neck pole 15.

Figure 4:
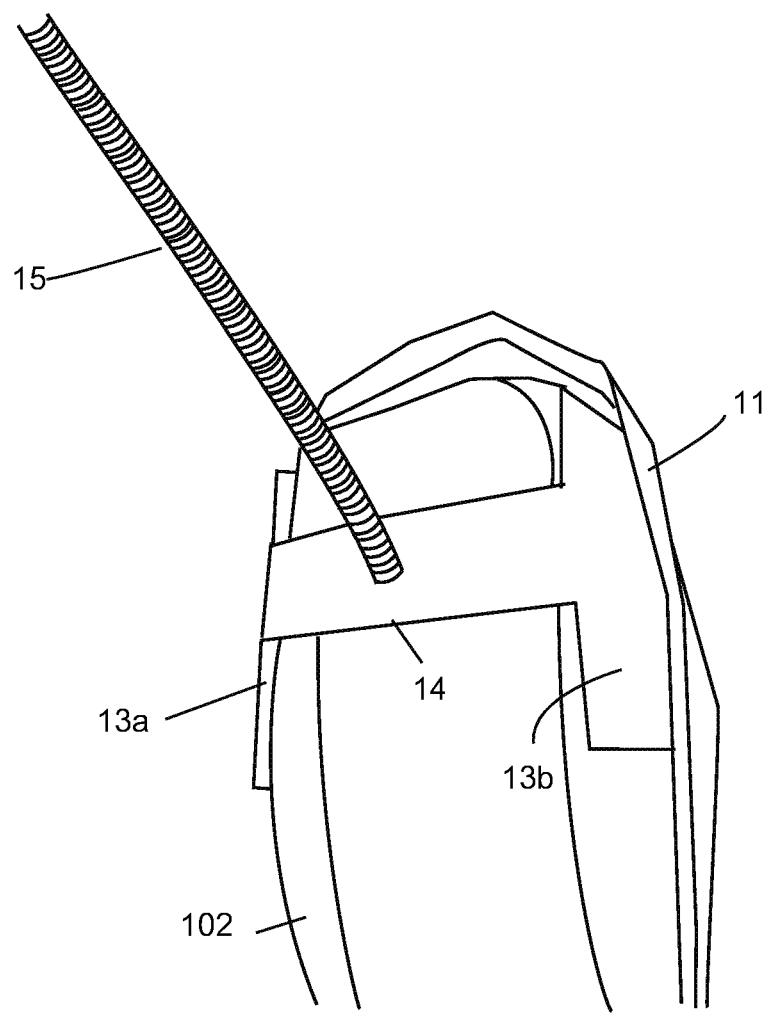
FIG. 4 is a top detail view of the bridge portion of the invention as installed on the arm of a child seat.

FIG. 4 is a top detail view of the bridge portion 14 of the invention as installed on the arm 101 of a child seat. Note that this figure also shows the two parts of the bracket—13a and 13b, discussed below. Note too the lower part of the goose-neck pole 15.

Figure 5:
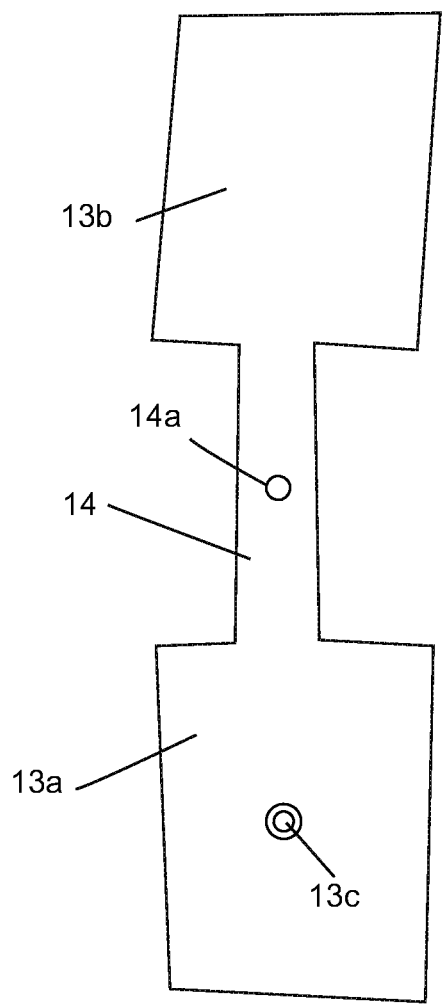
FIG. 5 is a detail view of the bracket and bridge portion of the invention.

FIG. 5 is a detail view of the bracket and bridge portion of the invention. As shown in this figure, the bracket 13 is made up of two sides: 13a and 13b that are connected by the bridge 14. Note that side 13a has a fitting 13c attached to it, as discussed below. Note too, the attachment fitting 14a for the goose-neck pole 15 in the bridge 14. The two bracket sides are flexibly attached to the bridge 14 so that the bracket/bridge can wrap around the top of the seat arm, as discussed above.

Figure 6:
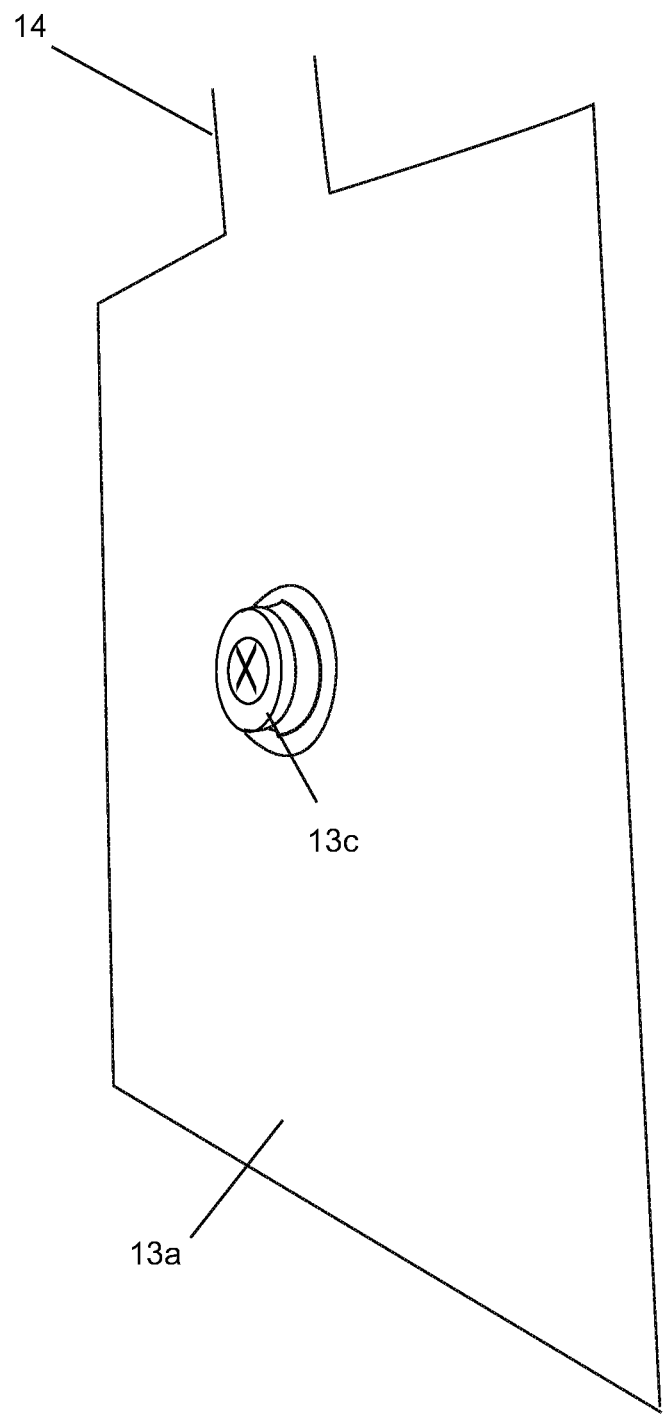
FIG. 6 is an enlarged detail view of one of the brackets of the invention showing a clip for the strap used in the preferred embodiment.

FIG. 6 is an enlarged detail view of bracket side 13a of the invention showing a fitting 13c for the strap 11 (not shown). As discussed below, the fitting 13c is used to attach a fitting in the strap to the bracket 13. In this way, the strap is held securely to one of the bracket sides, to ensure the strap remains in position during use.

As shown in FIGS. 1-3, the device can be held in place with a strap 11 that passes around the arm rest 101. However, to ensure that the strap 11 remains in position during use, the preferred embodiment uses a supplemental strap and fastener, as discussed below.

Figure 7:
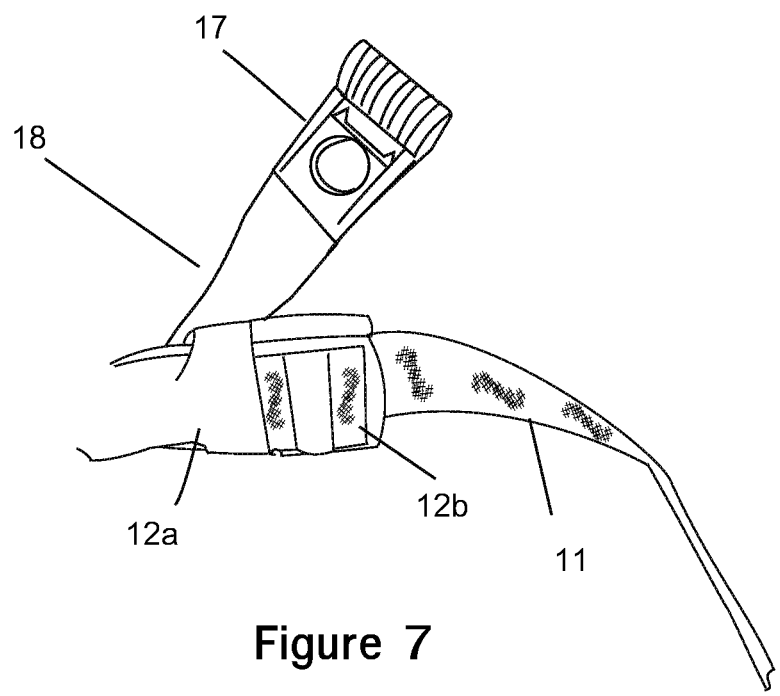
FIG. 7 is a detail view of the snap clip showing the auxiliary clip as used in the preferred embodiment.
Figure 7A:
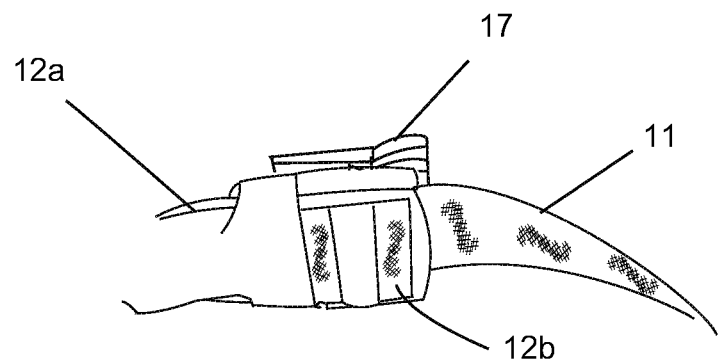

FIG. 7 is a detail view of the snap clip showing the strap fastener as used in the preferred embodiment. In the preferred embodiment, the strap 11 is not simply wrapped around the bracket and arm rest. The strap 11 is secured to the bracket using the fitting 13c. To do this, an auxiliary clip 17 is attached to the back of the strap 11 with a small piece of strapping 18. In reality, the auxiliary clip 17 is positioned right behind the rear portion 12c of the male clip 12b. The auxiliary clip and strap 17 and 18 are as shown to show a full view the auxiliary clip. The auxiliary clip 17 is actually positioned as shown in FIG. 7a.

Figure 8:
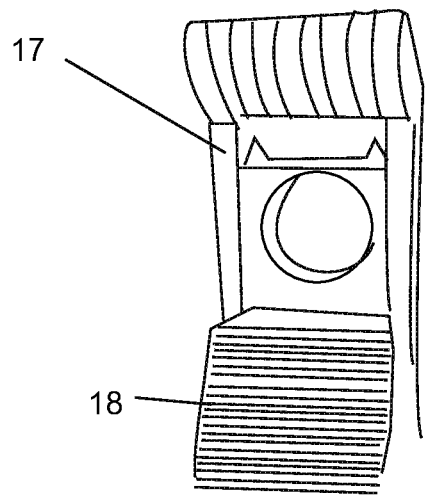
FIG. 8 is a detail view of the front side of the strap fastener that is attached to the connector on the side bracket of the invention used in the preferred embodiment.

FIG. 8 is a detail view of the front side of the auxiliary clip 17 that is attached to the connector 13c on the side bracket 13a of the invention used in the preferred embodiment.

Figure 9:
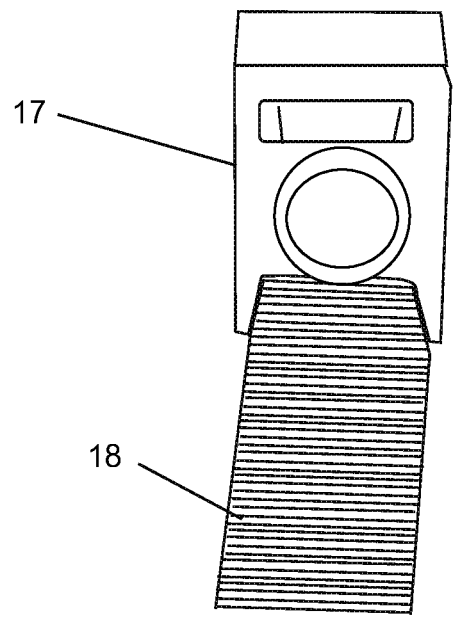
FIG. 9 is a detail view of the rear side of the strap fastener that is attached to the connector on the side bracket of the invention used in the preferred embodiment.

FIG. 9 is a detail view of the rear side of the auxiliary clip 17 that is attached to the connector 13c on the side bracket 13a of the invention used in the preferred embodiment.

Figure 10:
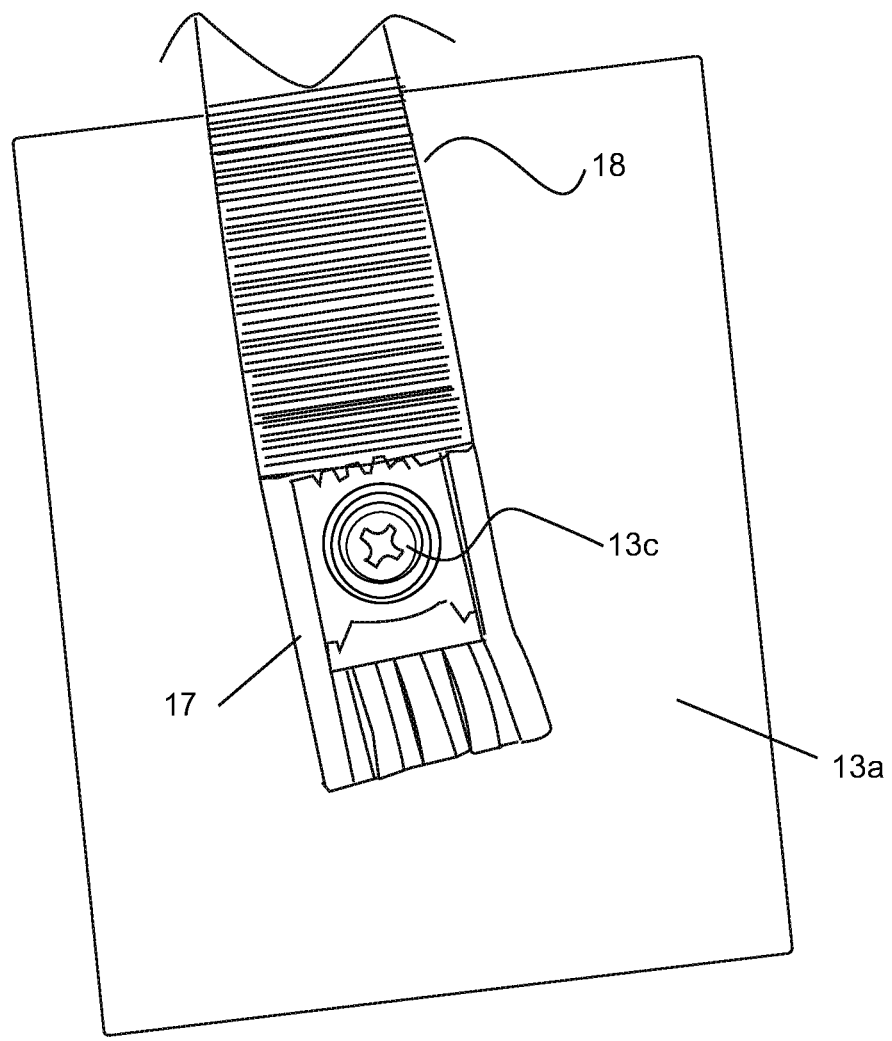
FIG. 10 is a detail view of the strap fastener that is attached to the connector on the side bracket of the invention as used in the preferred embodiment.

FIG. 10 is a detail view of the auxiliary clip 17 that is attached to the connector 13c on the side bracket 13a of the invention as used in the preferred embodiment. The auxiliary clip 17 snaps onto the connector 13c for use. It can be snapped off when the invention is removed from the arm rest 101.

Figure 11:
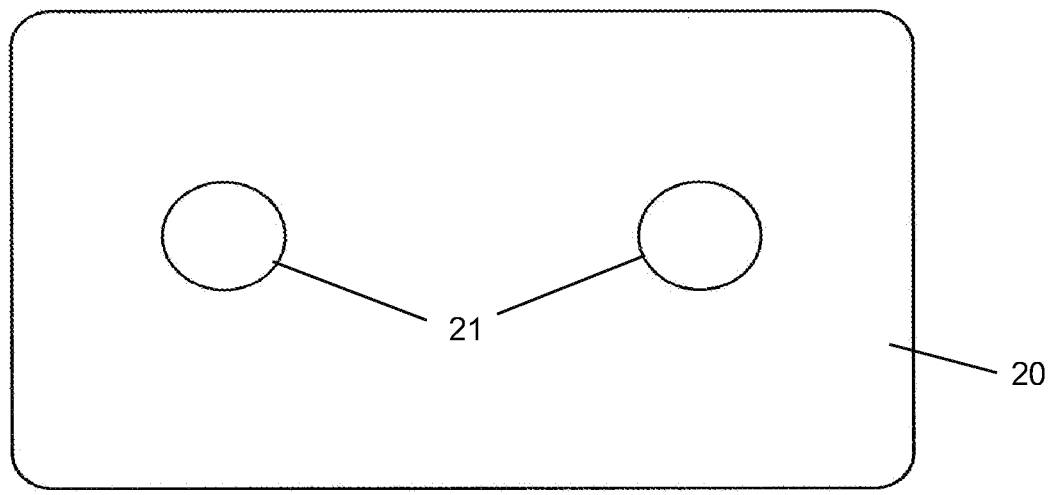
FIG. 11 is a rear detail view of an over-sized device holder.
Figure 12:
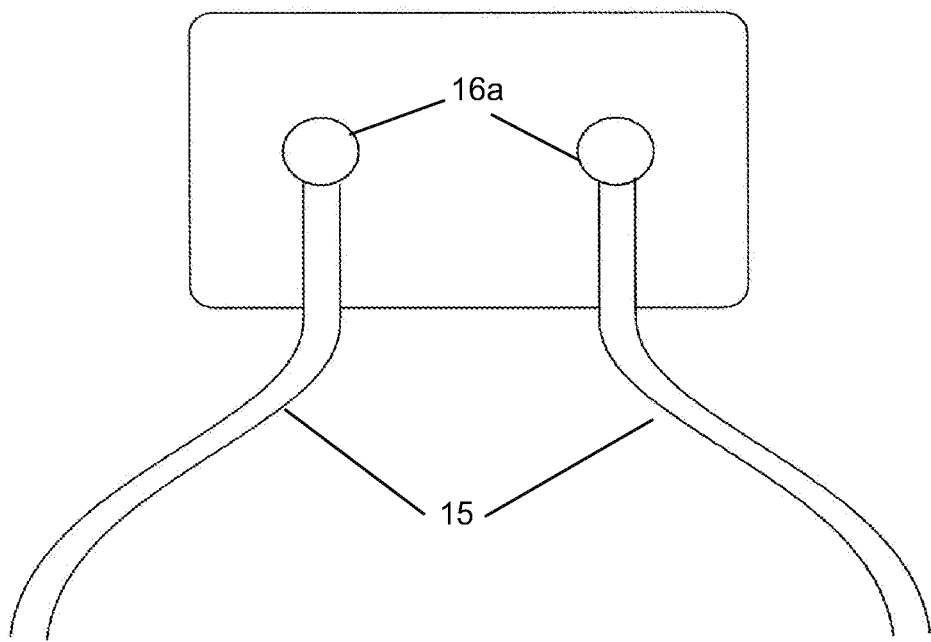
FIG. 12 is a rear detail view of the over-sized device holder showing two goose-neck poles attached.

Referring now to FIGS. 11 and 12, an over-sized device holder 20 is shown. This holder is designed to hold larger tablets and small laptop computers. At the rear of the holder is a pair of knobs 21 that are used to connect two goose-neck poles 15, see FIG. 12. The goose-neck poles 15 have replacement tops 16a, which are designed to fit over and hold the knobs 21. as seen in FIG. 12, two goose-neck poles 15 are needed. These poles go to two arm rest units 10 (not shown) (one on each arm rest). The arm rest units 10 are the same as in the the embodiments above. In this way, the two units 10 can support larger devices than a single unit is capable of holding.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A support for electronic devices with an attachment to a child seat having at least one armrest comprising:
    a) a bracket, said bracket having a flexible bridge having two ends and two bracket sides each of said two bracket sides being flexibly attached to one of said two ends of said flexible bridge;
    b) a strap for holding said bracket sides on said at least one armrest;
    c) a flexible goose-neck pole having a proximate end and a distal end, and further wherein the proximate end of said goose-neck pole is attached to said bridge and extends upwardly therefrom; and
    d) an electronic device holder, attached to the distal end of said goose-neck pole.

2. The support for electronic devices of claim 1 wherein the strap has a locking clip attached thereto.

3. The support for electronic devices of claim 1 wherein the strap is adjustable.

4. The support for electronic devices of claim 2 wherein the strap is adjustable.

5. The support for electronic devices of claim 4 further comprising:
    a) a fitting attached to one of said bracket sides; and
    b) an auxiliary clip, attached to the back of said strap such that said auxiliary clip is aligned with and is attached to said fitting.

6. The support for electronic devices of claim 5 wherein the auxiliary clip is attached to said strap with a length of strapping.

7. The support for electronic devices of claim 1 further comprising:
    a) a second support device having:
        i) a bracket, said bracket having a flexible bridge having two ends and two bracket sides each of said two bracket sides being flexibly attached to each of said two ends of said flexible bridge;
        ii) a strap for holding said bracket sides on said at least one armrest;
        iii) a flexible goose-neck pole having a proximate end and a distal end, and further wherein the proximate end of said goose-neck pole is attached to said bridge and extends upwardly therefrom; and
        iv) an electronic device holder, attached to the distal end of said goose-neck pole;
    b) an over-sized device holder having a back surface and further having two knobs protruding from said back surface; and
    b) further wherein each of said electronic device holders, attached to the distal end of each of said goose-neck poles comprises a device for attaching to one of said two knobs on said over-sized device holder.

8. The support for electronic devices of claim 7 wherein said child seat has a left armrest and a right armrest.

9. The support for electronic devices of claim 8 wherein one of said two support devices is placed on the left armrest on said child seat and the second of said two support devices is placed on the right armrest of said child seat.

* * * * *